(12) United States Patent
Kanno et al.

(10) Patent No.: US 8,416,484 B2
(45) Date of Patent: Apr. 9, 2013

(54) VIBRATING MIRROR ELEMENT

(75) Inventors: Isaku Kanno, Kyoto (JP); Manabu Murayama, Daito (JP); Hitoshi Fujii, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 666 days.

(21) Appl. No.: 12/612,947

(22) Filed: Nov. 5, 2009

(65) Prior Publication Data
US 2010/0142023 A1    Jun. 10, 2010

(30) Foreign Application Priority Data
Dec. 5, 2008   (JP) .................................. 2008-310365

(51) Int. Cl.
G02B 26/08   (2006.01)

(52) U.S. Cl. ............... 359/224.1; 359/198.1; 359/199.1; 359/199.4; 359/200.8

(58) Field of Classification Search .... 359/198.1–199.4, 359/200.6–200.8, 213.1–215.1, 224.1–224.2
See application file for complete search history.

(56) References Cited

U.S. PATENT DOCUMENTS

| | | | |
|---|---|---|---|
| 6,989,919 B2 | 1/2006 | Yasui | |
| 7,236,283 B2 | 6/2007 | Kikuchi et al. | |
| 7,394,583 B2 | 7/2008 | Akedo et al. | |
| 7,446,911 B2 | 11/2008 | Asai et al. | |
| 2004/0263937 A1 | 12/2004 | Fujii et al. | |
| 2007/0089973 A1 | 4/2007 | Inui et al. | |
| 2007/0269199 A1 | 11/2007 | Mori et al. | |
| 2008/0231930 A1 | 9/2008 | Mizoguchi et al. | |
| 2009/0174921 A1* | 7/2009 | Sendo ........................ 359/200.7 |

FOREIGN PATENT DOCUMENTS

| | | |
|---|---|---|
| EP | 1 944 596 A1 | 7/2008 |
| JP | 2004-361889 A | 12/2004 |
| JP | 3767577 B2 | 2/2006 |
| JP | 2006-293116 A | 10/2006 |
| JP | 2007-10823 A | 1/2007 |
| JP | 3956933 B2 | 5/2007 |
| JP | 2007-312465 A | 11/2007 |
| JP | 2008-40353 A | 2/2008 |
| JP | 4092283 B2 | 3/2008 |
| JP | 2009-003165 A | 1/2009 |

OTHER PUBLICATIONS

European Search Report dated Mar. 17, 2010 (six (6) pages).

* cited by examiner

*Primary Examiner* — James Phan
(74) *Attorney, Agent, or Firm* — Crowell & Moring LLP

(57) ABSTRACT

This vibrating mirror element includes a pair of first beam portions supporting a mirror portion in a vibratile manner, a pair of second beam portions connected with the pair of first beam portions respectively, and a pair of driving portions connected with the pair of second beam portions respectively. The mirror portion is arranged in a region surrounded by the pair of second beam portions and the pair of driving portions. The width of the pair of first beam portions and the width of the pair of second beam portions are rendered smaller than the width of the pair of driving portions.

18 Claims, 6 Drawing Sheets

EMBODIMENT (EXAMPLE 1)

FIG. 12 EXAMPLE 2
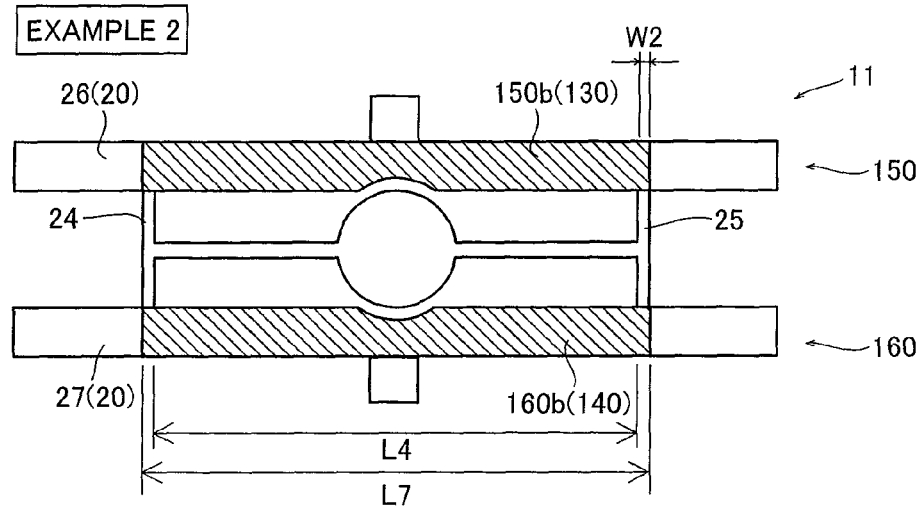
FIG. 13 EXAMPLE 3
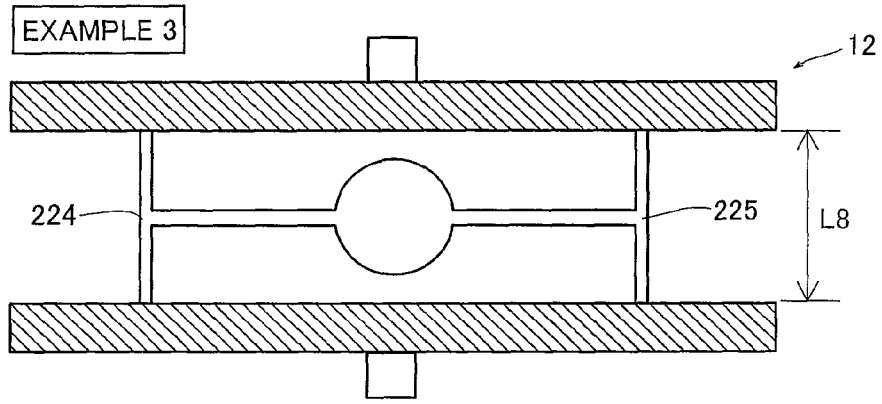
FIG. 14 EXAMPLE 4
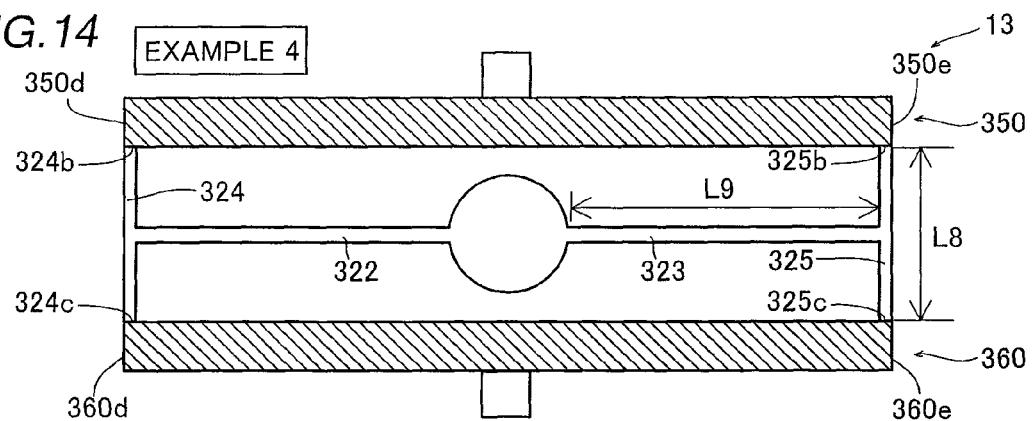

VIBRATING MIRROR ELEMENT

BACKGROUND OF THE INVENTION

1. Field of the Invention

The present invention relates to a vibrating mirror element, and more particularly, it relates to a vibrating mirror element including driving portions.

2. Description of the Background Art

A vibrating mirror element including driving portions is known in general, as disclosed in each of Japanese Patent No. 3956933, Japanese Patent Laying-Open Nos. 2007-312465 and 2007-10823, Japanese Patent No. 3767577, Japanese Patent Laying-Open Nos. 2004-361889 and 2006-293116 and Japanese Patent No. 4092283, for example.

The aforementioned Japanese Patent No. 3956933 discloses a vibrator (vibrating mirror element) including a reflecting mirror portion, a pair of first spring portions having first end portions connected to both sides of the reflecting mirror portion respectively for supporting the reflecting mirror portion in a vibratile manner, a pair of second spring portions connected to second end portions of the pair of first spring portions respectively and each branched into two portions, and driving sources made of a piezoelectric substance arranged on upper portions of the four branched portions of the pair of second spring portions. The pair of first spring portions of the vibrator are torsionally vibratile, while the pair of second spring portions are flexurally vibratile and torsionally vibratile. Thus, vibration from the driving sources is converted to flexural vibration of the pair of second spring portions and the flexural vibration of the pair of second spring portions is converted to torsional vibration of the pair of first spring portions, so that the reflecting mirror portion can change a light reflecting direction. The driving sources arranged on the upper portions of the second spring portions are formed to extend oppositely to the first spring portions and the reflecting mirror portion. Further, the first spring portions and the second spring portions are integrally formed while geometrical moments of inertia of the first spring portions are rendered larger than those of the second spring portions, and hence the width of the first spring portions is conceivably rendered larger than that of the second spring portions receiving the driving sources on the upper portions thereof.

The aforementioned Japanese Patent Laying-Open No. 2007-312465 discloses an optical scanning apparatus including a mirror, a rectangular movable frame provided with support portions having first end portions connected to both sides of the mirror respectively for supporting the mirror and formed on the outer peripheral side of the mirror to surround the mirror, and piezoelectric elements arranged on all of the four sides of the movable frame. In this optical scanning apparatus, the piezoelectric elements are arranged on all of the four sides of the movable frame, so that the movable frame can be displaced without twisting the support portions.

The aforementioned Japanese Patent Laying-Open No. 2007-10823 discloses a driving mirror including a mirror portion, beams having first end portions connected to both sides of the mirror portion respectively for supporting the mirror portion, four arms arranged in pairs to vertically hold the beams therebetween respectively for rotating the beams, and piezoelectric films provided on the four arms respectively.

The aforementioned Japanese Patent No. 3767577 discloses a scanning apparatus including a polariscope (mirror portion), an elastic body whose both end portions are fixed in a state arcuately deflecting an intermediate portion while the polariscope is fixed to a substantially central portion thereof, and driving means consisting of a piezoelectric element fixed onto one end portion of the elastic body.

The aforementioned Japanese Patent Laying-Open No. 2004-361889 discloses a scanning mirror including a rotating mirror and three cantilevers prepared by bonding elastic members and piezoelectric members to each other. In this scanning mirror, free ends of the three cantilevers are arranged above the peripheral portion of the rotating mirror respectively. The scanning mirror is formed to incline the rotating mirror by applying voltages to the three cantilevers respectively thereby vertically moving the free ends of the cantilevers and pressing the peripheral portion of the rotating mirror.

The aforementioned Japanese Patent Laying-Open No. 2006-293116 discloses an optical scanning apparatus (vibrating mirror element) including a mirror portion, a substrate provided with torsion beam portions having first end portions connected to both sides of the mirror portion respectively for supporting the mirror portion, and a piezoelectric body partially arranged on the substrate. In this optical scanning apparatus, the overall substrate vibrates by vibration from the piezoelectric body, whereby the torsion beam portions torsionally vibrate. Thus, the mirror portion is inclined.

The aforementioned Japanese Patent No. 4092283 discloses a two-dimensional optical scanner (vibrating mirror element) including a mirror portion, a pair of torsion bars swingably supporting the mirror portion from both sides, a movable frame, supporting end portions of the pair of torsion bars, formed to surround the mirror portion, forward end driving portions symmetrically arranged to hold the torsion bars therebetween for separately supporting the mirror portion in the vicinity of the pair of torsion bars, and piezoelectric unimorphic diaphragms symmetrically arranged in the vicinity of the forward end driving portions to hold the torsion bars therebetween. This two-dimensional optical scanner is so formed that the forward end driving portion arranged on the side of one of the torsion bars moves downward when the forward end driving portion arranged on the side of the other one of the torsion bars moves upward, thereby inclining the mirror portion and the torsion bars. The piezoelectric unimorphic diaphragms are symmetrically arranged to hold the pair of torsion bars therebetween, and hence the two-dimensional optical scanner is provided with four piezoelectric unimorphic diaphragms in total.

In the vibrator (vibrating mirror element) described in the aforementioned Japanese Patent No. 3956933, however, the width of the first spring portions is rendered larger than that of the second spring portions receiving the driving sources on the upper portions thereof, and hence the first spring portions are disadvantageously hard to deform. When flexural vibration of the second spring portions is converted to torsional vibration of the first spring portions, therefore, torsional vibration of the first spring portions may conceivably be so reduced that inclination and vibration of the reflecting mirror portion are disadvantageously reduced. Further, the driving sources arranged on the upper portions of the second spring portions are formed to extend oppositely to the first spring portions and the reflecting mirror portion, and hence a region occupied by the driving sources, the first spring portions and the reflecting mirror portion is disadvantageously elongated in the extensional direction of the driving sources in plan view. When the vibrator is assembled into an apparatus, therefore, the elongated region may conceivably so restrict the design of the apparatus that it is difficult to downsize the apparatus. Further, a structure for electrically connecting the driving sources with an external device is disadvantageously complicated due to the provision of the four driving sources made of the piezoelectric substance.

The optical scanning apparatus described in the aforementioned Japanese Patent Laying-Open No. 2007-312465 is formed not to twist the support portions, and hence inclination and vibration of the mirror may conceivably be disadvantageously reduced due to suppression of resonance on the support portions. Further, the piezoelectric elements are provided on the four sides of the movable frame respectively, and hence a structure for electrically connecting the piezoelectric elements with an external device is disadvantageously complicated.

In the driving mirror described in the aforementioned Japanese Patent Laying-Open No. 2007-10823, the width of the beams is conceivably rendered substantially identical to that of the four arms provided with the piezoelectric films, and hence the beams may conceivably be disadvantageously hard to deform. Therefore, torsional vibration of the beams may conceivably be so reduced that inclination and vibration of the mirror portion are disadvantageously reduced.

In each of the scanning apparatus and the scanning mirror described in the aforementioned Japanese Patent No. 3767577 and the aforementioned Japanese Patent Laying-Open No. 2004-361889, the piezoelectric element (piezoelectric members) is directly provided on the elastic body (cantilevers), and hence the elastic body (cantilevers) may conceivably be disadvantageously hard to resonate. Therefore, it may conceivably be disadvantageously difficult to enlarge vibration of the polariscope (rotating mirror) due to the difficulty in resonance of the elastic body (cantilevers).

In the optical scanning apparatus described in the aforementioned Japanese Patent Laying-Open No. 2006-293116, the overall substrate must be vibrated, and hence it may conceivably be disadvantageously difficult to enlarge vibration of the mirror portion.

The two-dimensional optical scanner described in the aforementioned Japanese Patent No. 4092283 includes the four piezoelectric unimorphic diaphragms, and hence a structure for electrically connecting the piezoelectric unimorphic diaphragms with an external device is disadvantageously complicated.

SUMMARY OF THE INVENTION

The present invention has been proposed in order to solve the aforementioned problems, and an object of the present invention is to provide a vibrating mirror element capable of enlarging vibration of a mirror portion while attaining downsizing of the vibrating mirror element and simplification of the structure thereof.

A vibrating mirror element according to an aspect of the present invention includes a mirror portion reflecting light, a pair of first beam portions having first end portions connected to both sides of the mirror portion respectively for supporting the mirror portion in a vibratile manner, a pair of second beam portions connected to second end portions of the pair of first beam portions respectively, and a pair of driving portions connected with first end portions and second end portions of the pair of second beam portions respectively for vibrating the mirror portion, and the mirror portion is arranged in a region surrounded by the pair of second beam portions and the pair of driving portions in plan view, while the width of the pair of first beam portions and the width of the pair of second beam portions are rendered smaller than the width of the pair of driving portions.

In the vibrating mirror element according to this aspect, as hereinabove described, the mirror portion is arranged in the region surrounded by the pair of second beam portions and the pair of driving portions so that the driving portions can be formed to extend on the side provided with the mirror portion, whereby elongation in the extensional direction of the driving portions can be suppressed. Thus, the vibrating mirror element can be downsized. Further, the vibrating mirror element is provided with the pair of driving portions, whereby a structure for electrically connecting the driving portions with an external device can be simplified as compared with a case where the vibrating mirror element is provided with at least three driving portions. In addition, the driving portions are not directly provided on the first and second beam portions, whereby the first beam portions can be easily resonated. Thus, vibration of the mirror portion can be enlarged. Further, the width of the pair of first beam portions and that of the pair of second beam portions are rendered smaller than the width of the pair of driving portions so that the pair of first beam portions and the pair of second beam portions can be easily deformed, whereby vibration of the mirror portion can be enlarged also according to this.

In the vibrating mirror element according to the aforementioned aspect, both end portions of the pair of driving portions preferably serve as free ends respectively, and the pair of second beam portions are preferably rendered inclinable by deformation of the pair of driving portions respectively, while the pair of first beam portions are preferably formed to incline the mirror portion by inclination of the pair of second beam portions. According to this structure, the mirror portion can be inclined through the pair of second beam portions and the pair of first beam portions by deformation of the pair of driving portions, whereby the mirror portion can be vibrated by alternately changing the direction for inclining the mirror portion.

In this case, the first beam portions are preferably formed to be torsionally deformable by inclination of the pair of second beam portions respectively, and the mirror portion is preferably inclined by inclination of the pair of second beam portions and torsional deformation of the pair of first beam portions. According to this structure, the mirror portion can be inclined not only by inclination of the pair of second beam portions but also by torsional deformation of the pair of first beam portions, whereby inclination and vibration of the mirror portion can be further enlarged.

In the vibrating mirror element according to the aforementioned aspect, at least one of end portions of the pair of driving portions extends to protrude outward beyond connecting portions between end portions of the second beam portions and the driving portions. According to this structure, driving force by the outwardly protruding portion of the driving portions acts as compared with a case where no end portion of the driving portions extends to protrude outward beyond the connecting portions between the end portions of the second beam portions and the driving portions, whereby inclination of the mirror portion can be further enlarged. The inventor has already verified the point that inclination of the mirror portion can be further enlarged by forming at least one of the end portions of the pair of driving portions to protrude outward beyond the connecting portions between the end portions of the second beam portions and the driving portions by simulations, as described later.

In this case, both end portions of at least one of the pair of driving portions preferably extend to protrude outward beyond the connecting portions between the end portions of the second beam portions and the pair of driving portions by substantially identical lengths respectively. According to this structure, driving force components provided by the outwardly protruding portions of the driving portions can be rendered substantially identical to each other on both end portions, whereby inclination of the mirror portion can be more reliably controlled.

In the aforementioned vibrating mirror element so formed that at least one of the end portions of the pair of driving portions extends to protrude outward, end portions, included in both end portions of the pair of driving portions, connected with one of the pair of second beam portions preferably extend to protrude outward beyond the connecting portions between the end portions of the second beam portions and the pair of driving portions by substantially identical lengths respectively. According to this structure, driving force components provided by the outwardly protruding portions of the end portions on the same sides of the pair of driving portions can be rendered substantially identical to each other, whereby inclination of the mirror portion can be more reliably controlled.

In the vibrating mirror element according to the aforementioned aspect, the pair of second beam portions are preferably substantially perpendicularly connected with the second end portions of the pair of first beam portions on substantially central portions of the pair of second beam portions respectively in plan view, while the pair of driving portions are preferably substantially perpendicularly connected with the first end portions and the second end portions of the pair of second beam portions respectively in plan view. According to this structure, the plane area occupied by the overall vibrating mirror element can be reduced, whereby the vibrating mirror element can be further downsized.

The vibrating mirror element according to the aforementioned aspect preferably further includes a pair of fixed portions provided in the vicinity of central portions of the pair of driving portions in the longitudinal direction respectively for constituting fixed ends in vibration of the pair of driving portions and fixing the pair of driving portions. According to this structure, the pair of driving portions can be vibrated with the fixed ends set on substantially central portions of the pair of driving portions in the longitudinal direction, whereby the pair of driving portions can be so vibrated that the quantities of deformation on both end portions of the pair of driving portions are substantially identical to each other. Thus, the quantity of deformation of either one of the pair of first beam portions can be inhibited from exceeding that of the other first beam portion through the pair of second beam portions due to different quantities of deformation on both end portions of the pair of driving portions, whereby breakage of the first beam portions can be suppressed.

In the vibrating mirror element according to the aforementioned aspect, a pair of recess portions are preferably formed on portions of the pair of driving portions corresponding to the periphery of the mirror portion to be along the periphery of the mirror portion respectively in plan view. According to this structure, the driving portions and the mirror portion can be proximately arranged, whereby the plane area occupied by the overall vibrating mirror element can be further reduced. Thus, the vibrating mirror element can be further downsized.

In this case, the vibrating mirror element preferably further includes a pair of fixed portions provided on sides opposite to connecting portions between end portions of the second beam portions and the pair of driving portions and in the vicinity of central portions of the pair of driving portions in the longitudinal direction respectively for constituting fixed ends in vibration of the pair of driving portions and fixing the pair of driving portions, and the pair of recess portions are preferably provided in the vicinity of the central portions of the pair of driving portions in the longitudinal direction on the sides of the connecting portions respectively. According to this structure, the pair of recess portions are positioned in the vicinity of the pair of fixed portions constituting the fixed ends of the pair of driving portions respectively, whereby the pair of driving portions can be inhibited from deformation on the positions of the pair of recess portions. Thus, the pair of recess portions which are narrow portions included in the pair of driving portions can be prevented from application of stress.

In the aforementioned vibrating mirror element provided with the recess portions, the widths of portions of the driving portions other than the recess portions are preferably rendered substantially identical to each other along the longitudinal direction of the driving portions. According to this structure, the driving portions can be rendered easily substantially uniformly deformable along the longitudinal direction, whereby vibration of the mirror portion can be easily controlled.

In the vibrating mirror element according to the aforementioned aspect, the width of the pair of first beam portions and the width of the pair of second beam portions are preferably rendered not more than half the width of the pair of driving portions. According to this structure, the pair of first beam portions and the pair of second beam portions can be more easily deformed, whereby vibration of the mirror portion can be further enlarged.

In the vibrating mirror element according to the aforementioned aspect, the mirror portion, the pair of first beam portions and the pair of second beam portions are preferably integrally formed. According to this structure, connecting portions between the mirror portion, the pair of first beam portions and the pair of second beam portions may not be additionally bonded to each other, whereby the mirror portion, the pair of first beam portions and the pair of second beam portions can be easily formed, while the respective connecting portions can be inhibited from detachment resulting from deformation of the pair of driving portions.

In this case, the pair of driving portions preferably include a pair of movable portions integrally formed with the mirror portion, the pair of first beam portions and the pair of second beam portions and a pair of driving elements formed on the surfaces of the pair of movable portions respectively. According to this structure, the connecting portions between the pair of second beam portions and the pair of driving portions may not be additionally bonded to each other, whereby the connecting portions between the pair of second beam portions and the pair of driving portions can be inhibited from detachment resulting from deformation of the pair of driving portions.

In the vibrating mirror element according to the aforementioned aspect, the pair of driving portions preferably include a pair of movable portions connected with the pair of second beam portions and a pair of driving elements formed substantially over the entire surfaces of the pair of movable portions. According to this structure, driving force in the pair of driving portions can be increased, whereby vibration of the mirror portion can be further enlarged.

In the vibrating mirror element according to the aforementioned aspect, the pair of driving portions are preferably formed to be driven by application of voltages respectively, the mirror portion and the pair of first beam portions are preferably formed to resonate at a prescribed resonance frequency, and the pair of driving portions are preferably formed to be deformed in opposite directions by application of voltages having frequencies substantially identical to the prescribed resonance frequency and having phases reverse to each other respectively. According to this structure, the pair of driving portions can be deformed in electrically opposite directions while the resonance frequency of the mirror portion and the pair of first beam portions and the frequencies of the pair of driving portions substantially coincide with each other, whereby the mirror portion can be more largely vibrated.

In the vibrating mirror element according to the aforementioned aspect, the pair of first beam portions are preferably formed to extend on a straight line passing through the center of the mirror portion toward one side of the mirror portion and toward another side of the mirror portion respectively, and the pair of driving portions are preferably formed to extend in a direction substantially parallel to the extensional direction of the pair of first beam portions respectively. According to this structure, the mirror portion can be more largely vibrated as compared with a case where the pair of first beam portions are not arranged on the straight line passing through the center of the mirror portion. Further, the pair of driving portions extend in the direction substantially parallel to the extensional direction of the pair of first beam portions respectively so that the driving force of the pair of driving portions can be substantially uniformly applied to the mirror portion through the pair of first beam portions, whereby inclination of the mirror portion can be more reliably controlled.

The vibrating mirror element according to the aforementioned aspect preferably further includes a pair of first outer beam portions having first end portions connected with the pair of driving portions respectively, a pair of second outer beam portions connected with second end portions of the pair of first outer beam portions respectively, and a pair of outer driving portions connected with first end portions and second end portions of the pair of second outer beam portions respectively for vibrating the mirror portion. According to this structure, the mirror portion can be two-dimensionally vibrated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a plan view showing the overall structure of a vibrating mirror element according to Example 2 of the present invention;

FIG. 13 is a plan view showing the overall structure of a vibrating mirror element according to Example 3 of the present invention;

FIG. 14 is a plan view showing the overall structure of a vibrating mirror element according to Example 4 of the present invention.

DESCRIPTION OF THE PREFERRED EMBODIMENTS

An embodiment of the present invention is now described with reference to the drawings.

First, the structure of a vibrating mirror element 10 according to the embodiment of the present invention is described with reference to FIGS. 1 to 5.

Figure 1:
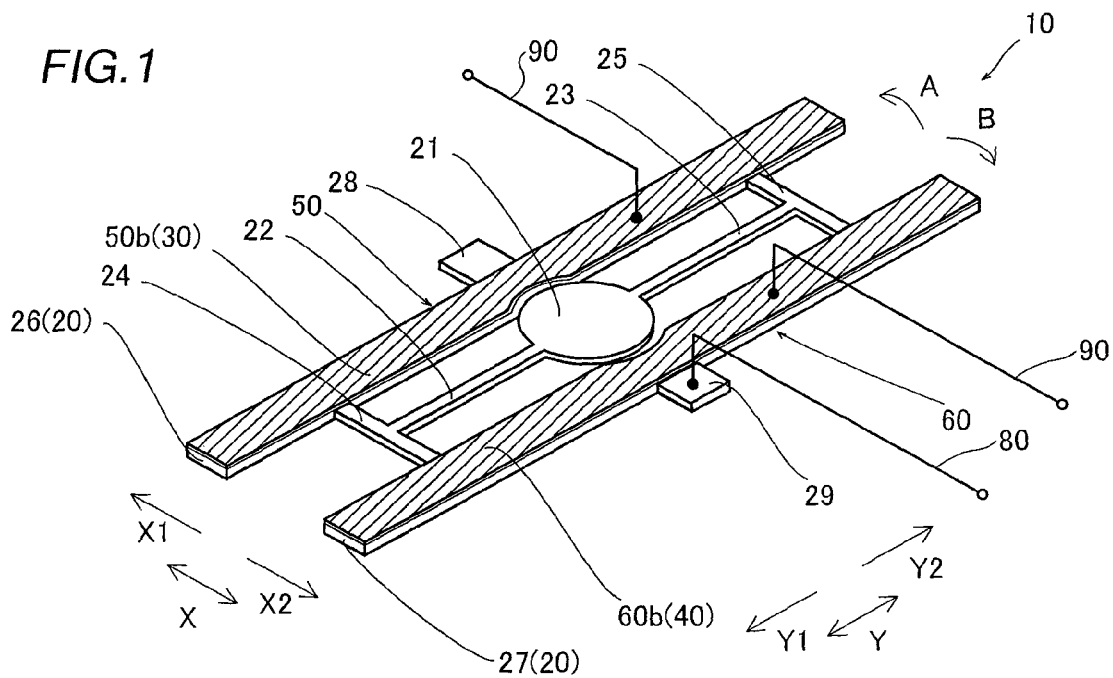
FIG. 1 is a perspective view showing the overall structure of a vibrating mirror element according to an embodiment of the present invention.
Figure 2:
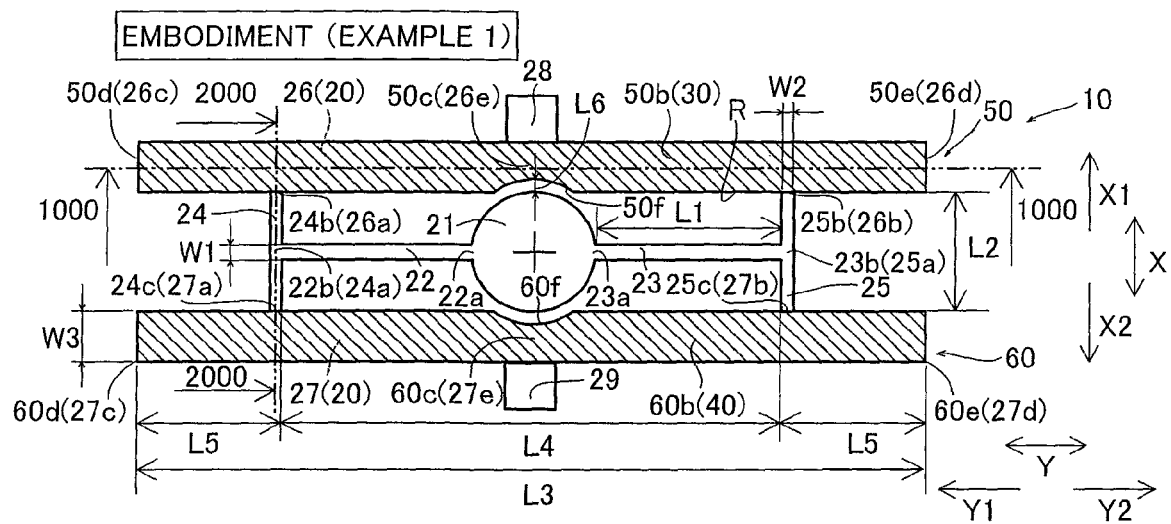
FIG. 2 is a plan view showing the overall structure of the vibrating mirror element according to the embodiment of the present invention.
Figure 3:
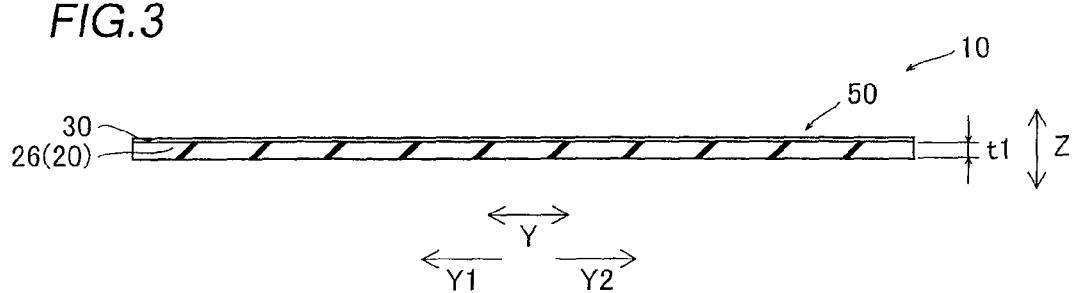
FIG. 3 is a sectional view of the vibrating mirror element taken along the line 1000-1000 in FIG. 2.
Figure 4:
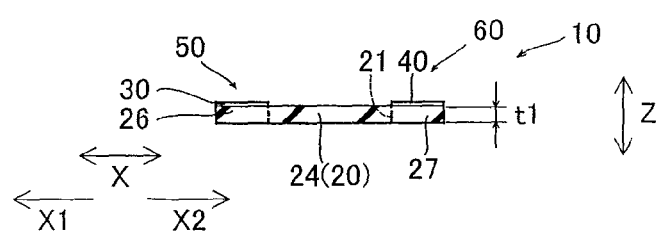
FIG. 4 is a sectional view of the vibrating mirror element taken along the line 2000-2000 in FIG. 2.

The vibrating mirror element 10 according to the embodiment of the present invention is constituted of a substrate 20 and piezoelectric elements 30 and 40 arranged on the substrate 20, as shown in FIGS. 1 and 2. The substrate 20 includes a mirror portion 21 reflecting light, torsion bars 22 and 23 having identical shapes, bars 24 and 25 having identical shapes, a movable portion 26 formed on the side of a direction X1, and another movable portion 27, having a shape identical to that of the movable portion 26, formed on the side of a direction X2. The torsion bar 22 and the bar 24 are formed on the side of the mirror portion 21 in a direction Y1, while the torsion bar 23 and the bar 25 are formed on the side of the mirror portion 21 in a direction Y2. The substrate 20 further includes fixed portions 28 and 29 on the side of the movable portion 26 in the direction X1 and on the side of the movable portion 27 in the direction X2 respectively. In other words, the mirror portion 21, the torsion bars 22 and 23, the bars 24 and 25, the movable portions 26 and 27 and the fixed portions 28 and 29 are integrally formed. The substrate 20 has a thickness t1 of about 60 μm in a direction Z, as shown in FIGS. 3 and 4. The torsion bars 22 and 23 are examples of the "first beam portions" in the present invention respectively, and the bars 24 and 25 are examples of the "second beam portions" in the present invention respectively.

As shown in FIG. 2, the mirror portion 21 of the substrate 20 has a circular shape of about 1.0 mm in diameter in plan view. The mirror portion 21 is connected with an end portion 22a of the torsion bar 22 on the side of the direction Y2 on the side of the direction Y1 of a straight line passing through the center of the mirror portion 21 and extending in the direction Y, and connected with an end portion 23a of the torsion bar 23 on the side of the direction Y1 on the side of the direction Y2 of the straight line. The torsion bars 22 and 23 are formed to extend on the straight line passing through the center of the mirror portion 21 and extending in the direction Y respectively. The mirror portion 21 is inclined by the torsion bars 22 and 23 in directions A and B (see FIG. 1), and supported by the torsion bars 22 and 23 to be vibratile. The torsion bars 22 and 23 are formed to be torsionally deformable and resonatable with the mirror portion 21. Thus, the mirror portion 21 is formed to be inclined by resonance in excess of the angle of inclination of the bars 24 and 25. As a result, the mirror portion 21 is so formed that, when a laser beam or the like is applied to the mirror portion 21, the angle of reflection of reflected light varies with the angle of inclination of the mirror portion 21. The torsion bars 22 and 23 have a length L1 of about 1.5 mm in the direction Y and a width W1 of about 150 µm in the direction X respectively. The length L1 of the torsion bars 22 and 23 in the direction Y may simply be at least about 1.3 mm and not more than about 1.7 mm, and the width W1 of the torsion bars 22 and 23 in the direction X may simply be at least about 100 µm and not more than about 250 µm. The end portions 22a and 23a are examples of the "first end portions of the first beam portions" in the present invention respectively.

The bar 24 is perpendicularly connected with an end portion 22b of the torsion bar 22 on the side of the direction Y1 on a central portion 24a of the bar 24 in the direction X in plan view. The bar 25 is perpendicularly connected with an end portion 23b of the torsion bar 23 on the side of the direction Y2 on a central portion 25a of the bar 25 in the direction X in plan view. The bars 24 and 25 have a length L2 of about 1.0 mm substantially identical to the diameter of the mirror portion 21 in the direction X and a width W2 of about 100 µm in the direction Y respectively. The length L2 of the bars 24 and 25 in the direction X may simply be at least about 1.0 mm and not more than about 1.5 mm, and the width W2 of the bars 24 and 25 in the direction Y may simply be at least about 100 µm and not more than about 250 µm. The bars 24 and 25 are formed to be inclinable in the direction X by deformation of the movable portions 26 and 27 (driving portions 50 and 60 described later). The end portions 22b and 23b are examples of the "second end portions of the first beam portions" in the present invention respectively.

According to this embodiment, an end portion 24b of the bar 24 on the side of the direction X1 and an end portion 25b of the bar 25 on the side of the direction X1 are perpendicularly connected with connecting portions 26a and 26b of the movable portion 26 on the sides of the directions Y1 and Y2 respectively in plan view. An end portion 24c of the bar 24 on the side of the direction X2 and an end portion 25c of the bar 25 on the side of the direction X2 are perpendicularly connected with connecting portions 27a and 27b of the movable portion 27 on the sides of the directions Y1 and Y2 respectively in plan view. Thus, the bar 24 is connected to the sides of the movable portions 26 and 27 in the direction Y1 respectively, while the bar 25 is connected to the sides of the movable portions 26 and 27 in the direction Y2 respectively. The mirror portion 21 and the torsion bars 22 and 23 are arranged in a region R formed by the bars 24 and 25 and the movable portions 26 and 27 in plan view.

The movable portions 26 and 27 have a length L3 of about 6.0 mm in the direction Y which is the longitudinal direction respectively, and have a width W3 of about 500 µm in the direction X, except recess portions 50f and 60f described later. In other words, the movable portions 26 and 27 are formed to extend parallelly to the straight line passing through the center of the mirror portion 21 and extending in the direction Y and to have substantially identical widths W3 except the recess portions 50f and 60f respectively. On the other hand, the interval L4 between the bars 24 and 25 in the direction Y, corresponding to the total length of the mirror portion 21 and the torsion bars 22 and 23 in the direction Y, is about 4.0 mm. In other words, the interval L4 between the bars 24 and 25 in the direction Y is rendered smaller than the length L3 of the movable portions 26 and 27 (driving portions 50 and 60 described later) in the direction Y. The length L3 of the movable portions 26 and 27 in the direction Y may simply be at least about 6.0 mm and not more than about 6.5 mm, and the width W3 of the movable portions 26 and 27 in the direction X may simply be at least about 500 µm and not more than about 900 µm.

According to this embodiment, the width W1 of the torsion bars 22 and 23 and the width W2 of the bars 24 and 25 are rendered not more than half the width W3 of the movable portions 26 and 27 respectively.

According to this embodiment, an end portion 26c of the movable portion 26 on the side of the direction Y1 and an end portion 27c of the movable portion 27 on the side of the direction Y1 are positioned closer to the side of the direction Y1 than the connecting portions 26a and 27a respectively, while an end portion 26d of the movable portion 26 on the side of the direction Y2 and an end portion 27d of the movable portion 27 on the side of the direction Y2 are positioned closer to the side of the direction Y2 than the connecting portions 26b and 27b respectively. Thus, the end portions 26c and 26d of the movable portion 26 and the end portions 27c and 27d of the movable portion 27 are formed to protrude toward outer sides opposite to the positions where the mirror portion 21 and the torsion bars 22 and 23 are arranged respectively.

The distance between the end portion 26c and the connecting portion 26a of the movable portion 26 and the distance between the end portion 27c and the connecting portion 27a of the movable portion 27 are L5=(L3−L4)/2 (=about 1.0 mm) respectively. The distance between the end portion 26d and the connecting portion 26b of the movable portion 26 and the distance between the end portion 27d and the connecting portion 27b of the movable portion 27 are also L5=(L3−L4)/2 (=about 1.0 mm) respectively. In other words, the distance L5 between the end portion 26c and the connecting portion 26a of the movable portion 26, the distance L5 between the end portion 27c and the connecting portion 27a of the movable portion 27, the distance L5 between the end portion 26d and the connecting portion 26b of the movable portion 26 and the distance L5 between the end portion 27d and the connecting portion 27b of the movable portion 27 are rendered substantially identical to each other.

The fixed portion 28 protruding in the direction X1 is formed on the side of the central portion 26e of the movable portion 26 in the direction X1 opposite to the side of the connecting portions 26a and 26b. The fixed portion 29 protruding in the direction X2 is formed on the side of the central portion 27e of the movable portion 27 in the direction X2 opposite to the side of the connecting portions 27a and 27b. The fixed portions 28 and 29 are positioned on the sides of the mirror portion 21 in the directions X1 and X2 respectively, and so formed that the centers of the fixed portions 28 and 29 are positioned on a line extending from the center of the mirror portion 21 in the direction X respectively. Further, the central portions 26e and 27e of the movable portions 26 and 27 are also positioned on the line extending from the center of the mirror portion 21 in the direction X.

The fixed portions 28 and 29 are fixed to bases (not shown) with an ultraviolet curing adhesive or the like respectively, formed to function as fixed ends when the movable portions 26 and 27 (driving portions 50 and 60) are concavely or convexly deformed to vibrate, and provided in the vicinity of central portions 50c and 60c, described later, of the driving portions 50 and 60 respectively.

Figure 5:
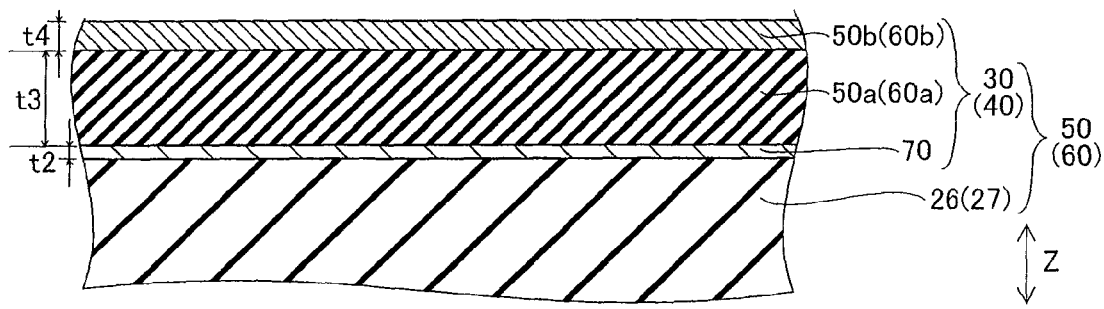
FIG. 5 is an enlarged sectional view showing a portion around a piezoelectric element of the vibrating mirror element shown in FIGS. 3 and 4.

As shown in FIGS. 3 and 4, piezoelectric elements 30 and 40 (see FIG. 4) are formed substantially on the overall upper surfaces of the movable portions 26 and 27 (see FIG. 4) of the substrate 20. The movable portion 26 and the piezoelectric element 30 form the driving portion 50, while the movable portion 27 and the piezoelectric element 40 form the driving portion 60 (see FIG. 4). More specifically, a lower electrode 70 having a thickness t2 of about 120 nm in the direction Z is formed on the upper surfaces of the movable portions 26 and 27 of the substrate 20, as shown in FIG. 5. The lower electrode 70 is formed not only on the upper surfaces of the movable portions 26 and 27, but also over the entire surface of the substrate 20. Thus, the piezoelectric elements 30 and 40 can be wired to the lower electrode 70 on arbitrary portions of the substrate 20. As shown in FIG. 1, the lower electrode 70 is electrically connected with an external device by a terminal 80 on the upper surface of the fixed portion 29.

Piezoelectric bodies 50a and 60a having a thickness t3 of about 3 μm in the direction Z are formed substantially over the entire upper surfaces of portions of the lower electrode 70 located on the upper surfaces of the movable portions 26 and 27 respectively. The piezoelectric bodies 50a and 60a are made of lead zirconate titanate (PZT), and polarized in the thickness direction (direction Z), to be expanded/contracted in the direction Y (see FIG. 3) when voltages are applied thereto.

Upper electrodes 50b and 60b having a thickness t4 of about 500 nm in the direction Z are formed substantially over the entire upper surfaces of the piezoelectric bodies 50a and 60a respectively. The lower electrode 70, the piezoelectric body 50a and the upper electrode 50b form the piezoelectric element 30 on the side of the vibrating mirror element 10 in the direction X1 (see FIG. 4), while the movable portion 26 and the piezoelectric element 30 form the driving portion 50. On the other hand, the lower electrode 70, the piezoelectric element 60a and the upper electrode 60b form the piezoelectric element 40 on the side of the vibrating mirror element 10 in the direction X2 (see FIG. 4), while the movable portion 27 and the piezoelectric element 40 form the driving portion 60. As shown in FIG. 2, the driving portions 50 and 60 have the length L3 of about 6.0 mm in the direction Y which is the longitudinal direction and the width W3 of about 500 μm in the direction X, similarly to the movable portions 26 and 27. The length L3 of the driving portions 50 and 60 in the direction Y may simply be at least about 6.0 mm and not more than about 6.5 mm, and the width W3 of the driving portions 50 and 60 in the direction X may simply be at least about 500 μm and not more than about 900 μm. As shown in FIG. 1, the upper electrodes 50b and 60b are electrically connected with external devices by terminals 90 respectively.

According to this embodiment, the driving portions 50 and 60 are formed to be concavely and convexly deformable in the direction Z with fixed ends defined by the central portions 50c and 60c in the vicinity of the fixed portions 28 and 29 and free ends defined by end portions 50d and 60d on the side of the direction Y1 and end portions 50e and 60e on the side of the direction Y2 when voltages are applied to the upper electrodes 50b and 60b (see FIG. 5) and the lower electrode 70 (see FIG. 5). More specifically, when voltages for contracting the piezoelectric bodies 50a and 60a are applied to the upper electrodes 50b and 60b and the lower electrode 70, the piezoelectric bodies 50a and 60a arranged on the upper surfaces of the movable portions 26 and 27 are deformed to warp the end portions 50d, 50e, 60d and 60e serving as the free ends upward. Thus, the driving portions 50 and 60 are so concavely deformed that the central portions 50c and 60c serving as the fixed ends are positioned below the end portions 50d, 50e, 60d and 60e serving as the free ends.

When voltages for expanding the piezoelectric bodies 50a and 60a are applied to the upper electrodes 50b and 60b and the lower electrode 70, on the other hand, the piezoelectric bodies 50a and 60a arranged on the upper surfaces of the movable portions 26 and 27 are deformed to warp the end portions 50d, 50e, 60d and 60e serving as the free ends downward. Thus, the driving portions 50 and 60 are so convexly deformed that the central portions 50c and 60c serving as the free ends are positioned above the end portions 50d, 50e, 60d and 60e serving as the free ends.

The voltages applied to the upper electrodes 50b and 60b and the lower electrode 70 mainly have sinusoidal waveforms. Thus, the driving portions 50 and 60 repeat vibratile movement of being concavely deformed from undeformed states, returning to the undeformed states again and thereafter being convexly deformed. The phases of a voltage V1 applied to the upper electrode 50b of the driving portion 50 and the lower electrode 70 and a voltage V2 applied to the upper electrode 60b of the driving portion 60 and the lower electrode 70 are reverse to each other. Further, the frequencies of the sinusoidal voltages V1 and V2 and the resonance frequency of the mirror portion 21, the torsion bars 22 and 23 and the driving portions 50 and 60 substantially coincide with each other. Thus, the mirror portion 21 and the torsion bars 22 and 23 so resonate that the mirror portion 21 can be vibrated in the directions A and B at an angle larger than the angle of inclination of the bars 24 and 25.

According to this embodiment, the end portions 50d and 60d of the driving portions 50 and 60 on the side of the direction Y1 are positioned closer to the side of the direction Y1 than the connecting portions 26a and 27a respectively, while the end portions 50e and 60e of the driving portions 50 and 60 on the side of the direction Y2 are positioned closer to the side of the direction Y2 than the connecting portions 26b and 27b respectively, similarly to the movable portions 26 and 27. Thus, the end portions 50d, 50e, 60d and 60e of the driving portions 50 and 60 are formed to protrude toward the outer sides opposite to the positions where the mirror portion 21 and the torsion bars 22 and 23 are arranged respectively.

The recess portions 50f and 60f formed to correspond to the periphery of the mirror portion 21 are provided on the sides of the central portions of the driving portions 50 and 60 in the directions X2 and X1 respectively. The recess portions 50f and 60f are so formed that the mirror portion 21 and the driving portions 50 and 60 do not come into contact with each other, and the interval L6 between the mirror portion 21 and the driving portions 50 and 60 in portions corresponding to the recess portions 50f and 60f is about 100 μm.

A driving operation of the vibrating mirror element 10 according to the embodiment of the present invention is now described with reference to FIGS. 5 to 11.

Figure 6:
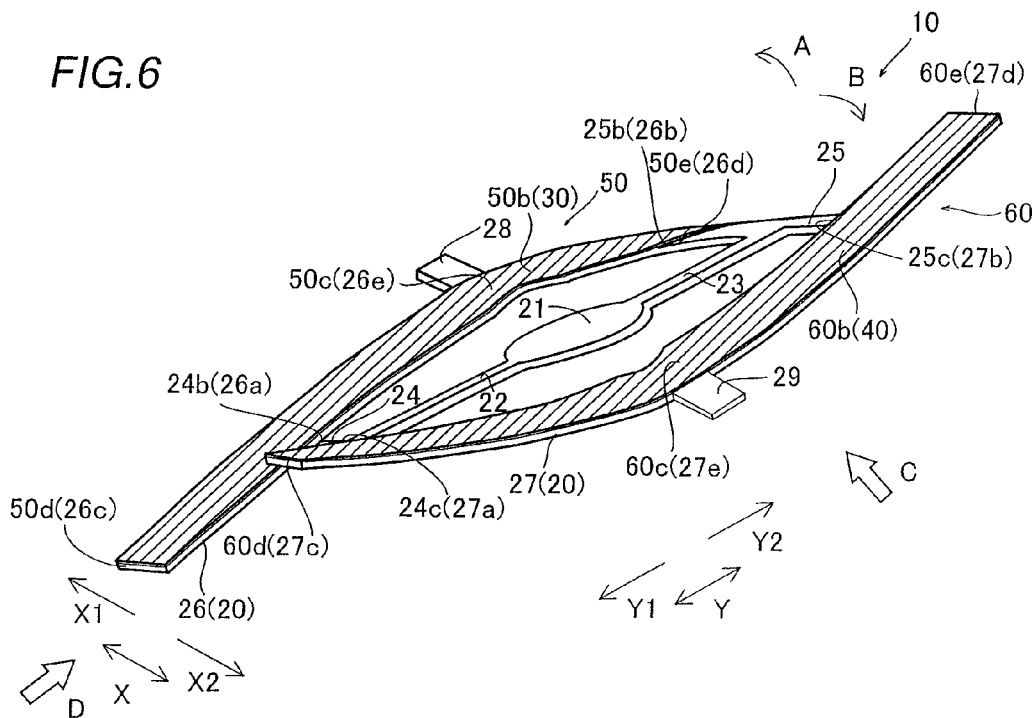
FIG. 6 is a diagram for illustrating a method of driving the vibrating mirror element according to the embodiment of the present invention.
Figure 7:
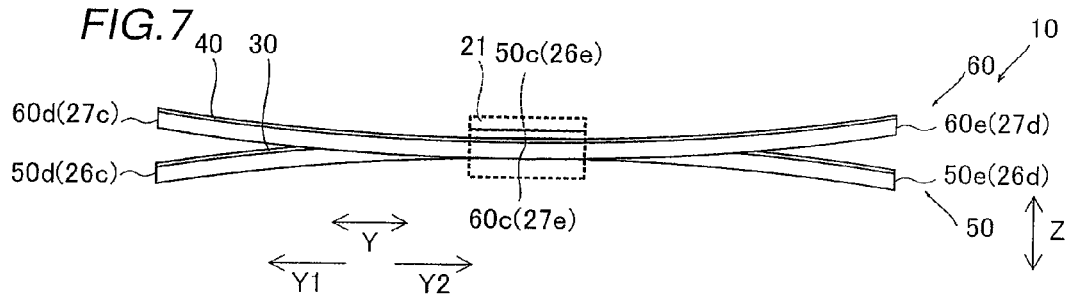
FIG. 7 is a diagram for illustrating the method of driving the vibrating mirror element as viewed from a direction C in FIG. 6.

When the voltage V1 (about 8 V) for expanding the piezoelectric body 50a is applied to the upper electrode 50b and the lower electrode 70 while the voltage V2 (about 8 V) for contracting the piezoelectric body 60a is applied to the upper electrode 60b and the lower electrode 70 as shown in FIG. 5, the driving portion 50 is so convexly deformed that the central portion 50c serving as the fixed end is positioned above the end portions 50d and 50e serving as the free ends and the driving portion 60 is so concavely deformed that the central portion 60c serving as the fixed end is positioned below the end portions 60d and 60e serving as the free ends, as shown in FIGS. 6 and 7.

Figure 8:
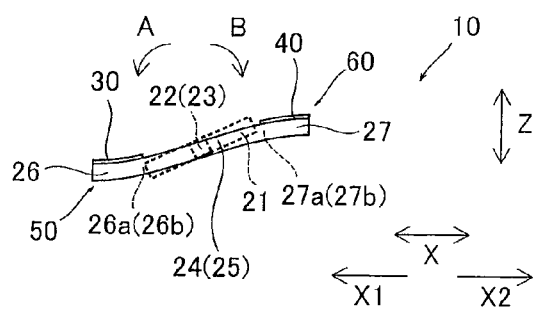
FIG. 8 is a diagram for illustrating the method of driving the vibrating mirror element as viewed from a direction D in FIG. 6.

Thus, the connecting portions 26a and 26b of the movable portion 26 positioned on a lower portion of the driving portion 50 are positioned downward as compared with the connecting portions 27a and 27b of the movable portion 27 positioned on a lower portion of the driving portion 60 as shown in FIG. 8, whereby the bars 24 and 25 are inclined downward from the side of the movable portion 27 toward the side of the movable portion 26 (direction X1) respectively. Following inclination of the bars 24 and 26, the torsion bars 22 and 23 are inclined downward from the side of the movable portion 27 toward the side of the movable portion 26 (direction X1), as shown in FIG. 6. Further, the resonance frequency of the mirror portion 21 and the torsion bars 22 and 23 and the frequencies of the sinusoidal voltages V1 and V2 substantially coincide with each other so that the mirror portion 21 and the torsion bars 22 and 23 resonate (resonance frequency: about 12 kHz), whereby force is applied to the torsion bars 22 and 23 to twist the same in the direction A at an angle larger than the angle of inclination of the bars 24 and 25. Thus, the mirror portion 21 is inclined in the direction A by about 10° at a maximum.

Figure 9:
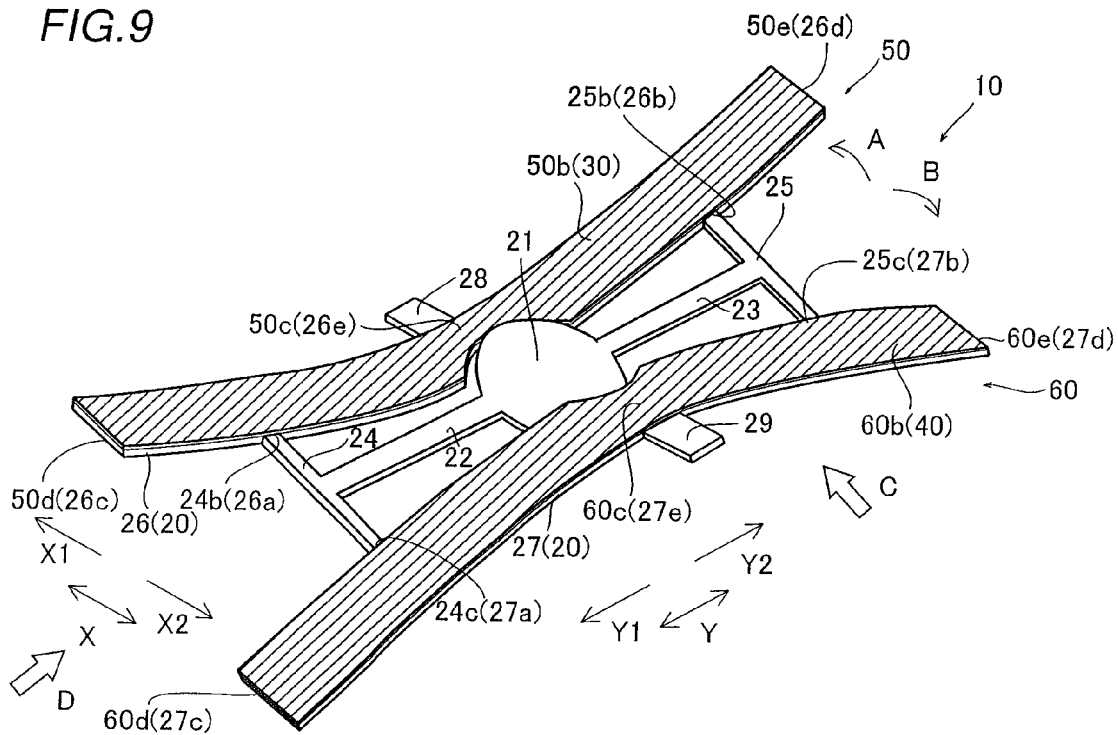
FIG. 9 is a diagram for illustrating the method of driving the vibrating mirror element according to the embodiment of the present invention.
Figure 10:
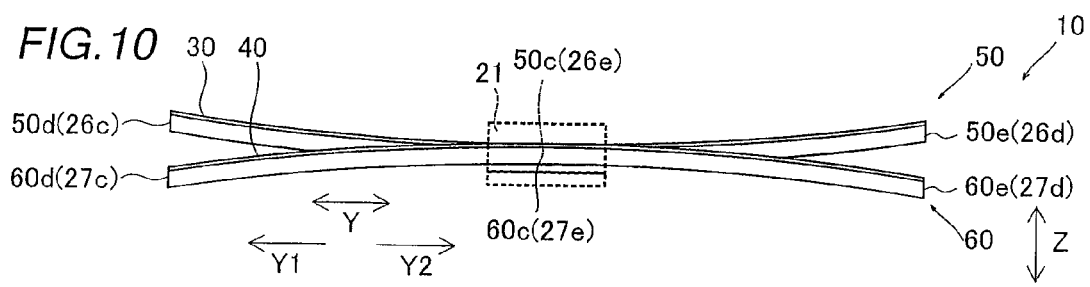
FIG. 10 is a diagram for illustrating the method of driving the vibrating mirror element as viewed from a direction C in FIG. 9.

When the voltage V1 (about 8 V) for contracting the piezoelectric body 50a is applied to the upper electrode 50b and the lower electrode 70 and the voltage V2 (about 8 V) for expanding the piezoelectric body 60a is applied to the upper electrode 60b and the lower electrode 70 as shown in FIG. 5, on the other hand, the driving portion 50 is so concavely deformed that the central portion 50c serving as the fixed end is positioned below the end portions 50d and 50e serving as the free ends and the driving portion 60 is so convexly deformed that the central portion 60c serving as the fixed end is positioned above the end portions 60d and 60e serving as the free ends, as shown in FIGS. 9 and 10.

Figure 11:
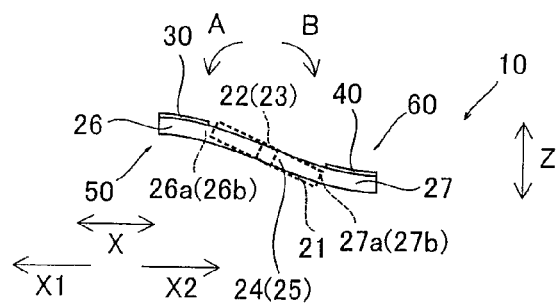
FIG. 11 is a diagram for illustrating the method of driving the vibrating mirror element as viewed from a direction D in FIG. 9.

Thus, the connecting portions 26a and 26b of the movable portion 26 positioned on the lower portion of the driving portion 50 are positioned upward as compared with the connecting portions 27a and 27b of the movable portion 27 positioned on the lower portion of the driving portion 60 as shown in FIG. 11, whereby the bars 24 and 25 are inclined downward from the side of the movable portion 26 toward the side of the movable portion 27 (direction X2) respectively. Following inclination of the bars 24 and 25, the torsion bars 22 and 23 are inclined downward from the side of the movable portion 26 toward the side of the movable portion 27 (direction X2), as shown in FIG. 9. Further, the resonance frequency of the mirror portion 21 and the torsion bars 22 and 23 and the frequencies of the sinusoidal voltages V1 and V2 substantially coincide with each other so that the mirror portion 21 and the torsion bars 22 and 23 resonate (resonance frequency: about 12 kHz), whereby force is applied to the torsion bars 22 and 23 to twist the same in the direction B at an angle larger than the angle of inclination of the bars 24 and 25. Thus, the mirror portion 21 is inclined in the direction B by about 10° at a maximum.

The voltages applied to the upper electrodes 50b and 60b and the lower electrode 70 mainly have sinusoidal waveforms, whereby the driving portions 50 and 60 repeat the vibratile movement of being concavely deformed from the undeformed states, returning to the undeformed states again and thereafter being convexly deformed. Consequently, the sinusoidal voltage V1 (about 8 V) is applied to the upper electrode 50b of the driving portion 50 and the lower electrode 70 while the sinusoidal voltage V2 (about 8 V) having the phase reverse to that of the voltage V1 (about 8 V) is applied to the upper electrode 60b of the driving portion 60 and the lower electrode 70, whereby the mirror portion 21 supported by the torsion bars 22 and 23 in a vibratile manner repeats vibratile movement in the directions A and B at the angle of inclination of about 10° at a maximum through deformation of the driving portions 50 and 60, the bars 24 and 25 and the torsion bars 22 and 23. Thus, the vibrating mirror element 10 can one-dimensionally scan reflected light of a laser beam or the like applied to the mirror portion 21.

According to this embodiment, as hereinabove described, the mirror portion 21 is arranged in the region R surrounded by the bars 24 and 25 and the driving portions 50 and 60 so that the driving portions 50 and 60 can be formed to extend on the side provided with the mirror portion 21, whereby elongation in the extensional direction (direction Y) of the driving portions 50 and 60 can be suppressed. Thus, the vibrating mirror element 10 can be downsized. Further, the vibrating mirror element 10 is provided with the pair of driving portions 50 and 60, whereby a structure for electrically connecting the driving portions 50 and 60 with the external devices can be simplified as compared with a case where the vibrating mirror element 10 is provided with at least three driving portions. In addition, the driving portions 50 and 60 are not directly provided on the torsion bars 22 and 23 and the bars 24 and 25, whereby the torsion bars 22 and 23 can be easily resonated. Thus, vibration of the mirror portion 21 can be enlarged.

According to this embodiment, as hereinabove described, the width W1 of the torsion bars 22 and 23 and the width W2 of the bars 24 and 25 are rendered smaller than half the width W3 of the driving portions 50 and 60 (movable portions 26 and 27) so that the torsion bars 22 and 23 and the bars 24 and 25 can be more easily deformed, whereby vibration of the mirror portion 21 can be more enlarged.

According to this embodiment, as hereinabove described, the end portions 50d, 50e, 60d and 60e of the driving portions 50 and 60 serve as the free ends and the bars 24 and 25 are rendered inclinable by deformation of the driving portions 50 and 60 respectively while the torsion bars 22 and 23 are formed to incline the mirror portion 21 by inclination of the bars 24 and 25 so that the mirror portion 21 can be inclined through the bars 24 and 25 and the torsion bars 22 and 23 by deformation of the driving portions 50 and 60, whereby the mirror portion 21 can be vibrated by alternately changing the direction for inclining the mirror portion 21.

According to this embodiment, as hereinabove described, the torsion bars 22 and 23 are formed to be torsionally deformable by inclination of the bars 24 and 25 respectively while the mirror portion 21 is inclined by inclination of the bars 24 and 25 and torsional deformation of the torsion bars 22 and 23 so that the mirror portion 21 can be inclined not only by inclination of the bars 24 and 25 but also by torsional deformation of the torsion bars 22 and 23, whereby inclination and vibration of the mirror portion 21 can be further enlarged.

According to this embodiment, as hereinabove described, the end portions 50d, 50e, 60d and 60e of the driving portions 50 and 60 extend to protrude outward beyond the connecting portions (26a, 26b, 27a and 27b) between the end portions 24b, 24c, 25b and 25c of the bars 24 and 25 and the driving portions 50 and 60 respectively so that driving force by the outwardly protruding portions of the driving portions 50 and 60 acts as compared with a case where the end portions 50d, 50e, 60d and 60e of the driving portions 50 and 60 do not extend to protrude outward beyond the connecting portions 26a, 26b, 27a and 27b, whereby inclination of the mirror portion 21 can be further enlarged.

According to this embodiment, as hereinabove described, the distance L5 between the end portion 26c and the connecting portion 26a of the movable portion 26, the distance L5 between the end portion 27c and the connecting portion 27a of the movable portion 27, the distance L5 between the end portion 26d and the connecting portion 26b of the movable portion 26 and the distance L5 between the end portion 27d and the connecting portion 27b of the movable portion 27 are rendered substantially identical to each other so that driving force components provided by the outwardly protruding portions of the driving portions 50 and 60 can be rendered substantially identical to each other on the respective end portions 50d, 50e, 60d and 60e, whereby inclination of the mirror portion 21 can be more reliably controlled.

According to this embodiment, as hereinabove described, the bars 24 and 25 are perpendicularly connected with the end portions 22b and 23b of the torsion bars 22 and 23 on the central portions 24a and 25a respectively while the driving portions 50 and 60 are perpendicularly connected with the end portions 24b, 24c, 25b and 25c of the bars 24 and 25 respectively so that the plane area occupied by the overall vibrating mirror element 10 can be reduced, whereby the vibrating mirror element 10 can be further downsized.

According to this embodiment, as hereinabove described, the fixed portions 28 and 29 functioning as the fixed ends in vibration of the driving portions 50 and 60 and fixing the driving portions 50 and 60 are provided in the vicinity of the central portion 50c of the driving portion 50 on the side of the direction X1 and in the vicinity of the central portion 60c of the driving portion 60 on the side of the direction X2 respectively so that the driving portions 50 and 60 can be vibrated with the central portions 50c and 60c serving as the fixed ends, whereby the driving portions 50 and 60 can be so vibrated that the quantities of deformation of the end portions 50d, 50e, 60d and 60e of the driving portions 50 and 60 are substantially identical to each other. Thus, the quantity of deformation of either the torsion bar 22 or the torsion bar 23 can be inhibited from exceeding that of the torsion bar 23 or the torsion bar 22 through the bars 24 and 25 due to different quantities of deformation on the end portions 50d and 50e and different quantities of deformation on the end portions 60d and 60e, whereby breakage of the torsion bars 22 and 23 can be suppressed.

According to this embodiment, as hereinabove described, the recess portions 50f and 60f are formed on the portions (central portions) of the driving portions 50 and 60 corresponding to the periphery of the mirror portion 21 to be along the periphery of the mirror portion 21 respectively so that the driving portions 50 and 60 and the mirror portion 21 can be proximately arranged, whereby the plane area occupied by the overall vibrating mirror element 10 can be further reduced. Thus, the vibrating mirror element 10 can be further downsized.

According to this embodiment, as hereinabove described, the fixed portions 28 and 29 are provided in the vicinity of the central portion 50c of the driving portion 50 on the side of the direction X1 and in the vicinity of the central portion 60c of the driving portion 60 on the side of the direction X2 respectively while the recess portions 50f and 60f are provided on the side of the central portion of the driving portion 50 in the direction X2 and on the side of the central portion of the driving portion 60 in the direction X1 respectively so that the recess portions 50f and 60f are positioned in the vicinity of the fixed portions 28 and 29 respectively, whereby the driving portions 50 and 60 can be inhibited from deformation on the positions of the recess portions 50f and 60f. Thus, the recess portions 50f and 60f which are narrow portions included in the driving portions 50 and 60 can be prevented from application of stress.

According to this embodiment, as hereinabove described, the driving portions 50 and 60 (movable portions 26 and 27) are formed to have the substantially identical widths W3 except the portions of the recess portions 50f and 60f so that the driving portions 50 and 60 can be rendered easily substantially uniformly deformable along the longitudinal direction (direction Y), whereby vibration of the mirror portion 21 can be easily controlled.

According to this embodiment, as hereinabove described, the mirror portion 21, the torsion bars 22 and 23, the bars 24 and 25, the movable portions 26 and 27 and the fixed portions 28 and 29 are integrally formed so that connecting portions between the mirror portion 21, the torsion bars 22 and 23, the bars 24 and 25, the movable portions 26 and 27 and the fixed portions 28 and 29 may not be additionally bonded to each other, whereby the mirror portion 21, the torsion bars 22 and 23, the bars 24 and 25, the movable portions 26 and 27 and the fixed portions 28 and 29 can be easily formed, while the respective connecting portions can be inhibited from detachment resulting from deformation of the driving portions 50 and 60.

According to this embodiment, as hereinabove described, the piezoelectric elements 30 and 40 are formed substantially on the overall upper surfaces of the movable portions 26 and 27 respectively so that the driving force of the driving portions 50 and 60 can be increased, whereby vibration of the mirror portion 21 can be further enlarged.

According to this embodiment, as hereinabove described, the sinusoidal voltage V1 (about 8 V) is applied to the upper electrode 50b of the driving portion 50 and the lower electrode 70 while the sinusoidal voltage V2 (about 8 V) having the phase reverse to that of the voltage V1 (about 8 V) is applied to the upper electrode 60b of the driving portion 60 and the lower electrode 70 and the resonance frequency of the mirror portion 21 and the torsion bars 22 and 23 and the frequencies of the sinusoidal voltages V1 and V2 substantially coincide with each other so that the driving portions 50 and 60 can be deformed in electrically opposite directions while the resonance frequency of the mirror portion 21 and the torsion bars 22 and 23 and the frequencies of the sinusoidal voltages V1 and V2 substantially coincide with each other, whereby the mirror portion 21 can be more largely vibrated.

According to this embodiment, as hereinabove described, the torsion bars 22 and 23 are formed to extend on the straight line passing through the center of the mirror portion 21 and extending in the direction Y respectively, whereby the mirror portion 21 can be more largely vibrated as compared with a case where the torsion bars 22 and 23 are not arranged on the straight line passing through the center of the mirror portion 21.

According to this embodiment, as hereinabove described, the movable portions 26 and 27 are formed to extend parallelly to the straight line passing through the center of the mirror portion 21 and extending in the direction Y respectively so that the driving force of the driving portions 50 and 60 can be substantially uniformly applied to the mirror portion 21 through the torsion bars 22 and 23, whereby inclination of the mirror portion 21 can be more reliably controlled.

Simulations conducted in order to confirm the effects of the aforementioned embodiment of the present invention are now described with reference to FIGS. 2, 5 and 12 to 14.

In these simulations, Examples 1, 2, 3 and 4 were examined. Example 1 corresponds to the vibrating mirror element 10 according to the embodiment of the present invention shown in FIG. 2. In a vibrating mirror element 11 according to Example 2 shown in FIG. 12, the length L7 of piezoelectric elements 130 and 140 was set to 4.2 mm, so that the length L7 of driving portions 150 and 160 was identical to the total length (L4+W2+W2) of the interval L4 between bars 24 and 25 and the widths W2 of the bars 24 and 25. In a vibrating mirror element 12 according to Example 3 shown in FIG. 13, the length L8 of bars 224 and 225 was set to 1.5 mm. In a vibrating mirror element 13 according to Example 4 shown in FIG. 14, the length L8 of bars 324 and 325 was set to 1.5 mm and the length L9 of torsion bars 322 and 323 was set to 2.65 mm, thereby connecting end portions 350d, 350e, 360d and 360e of driving portions 350 and 360 and end portions 324b, 324c, 325b and 325c of the bars 324 and 325 with each other respectively. The structures of Examples 2 to 4 were rendered identical to that of Example 1, except the varied parameters.

Results of simulations as to angles of inclination of mirror portions and resonance frequencies conducted by setting voltages applied to upper electrodes and lower electrodes to 8 V in Examples 1, 2, 3 and 4 shown in FIGS. 2, 12, 13 and 14 respectively are now described. The angle of inclination of each mirror portion was set to have a minus value when the mirror portion was inclined in a direction A and to have a plus value when the mirror portion was inclined in a direction B.

In the simulation of Example 1 shown in FIG. 2, the angle of inclination of the mirror portion was −10.4° to +10.4°, and the resonance frequency was 12725 Hz. In the simulation of Example 2 shown in FIG. 12, the angle of inclination of the mirror portion was −6.2° to +6.2°, and the resonance frequency was 13600 Hz. In the simulation of Example 3 shown in FIG. 13, the angle of inclination of the mirror portion was −10.8° to +10.8°, and the resonance frequency was 10900 Hz. In the simulation of Example 4 shown in FIG. 14, the angle of inclination of the mirror portion was −6.6° to +6.6°, and the resonance frequency was 13750 Hz.

Comparing Examples 1 and 2 with each other from the aforementioned results of the simulations, it has been recognized that the angle of inclination of the mirror portion is reduced when the length of the piezoelectric elements is increased as in Example 1. In other words, it has been recognized that the angle of inclination of the mirror portion 21 can be enlarged by forming the end portions 50d, 50e, 60d and 60e of the driving portions 50 and 60 in the vibrating mirror element 10 according to the embodiment of the present invention to protrude toward the outer sides opposite to the positions where the mirror portion 21 and the torsion bars 22 and 23 are arranged respectively. This is conceivably because the driving force of the outwardly protruding portions of the driving portions mainly contributes not to resonance but to inclination of the mirror portion and the torsion bars.

Comparing Examples 1 and 3 with each other, it has been recognized that the angle of inclination of the mirror portion is enlarged and the resonance frequency is reduced when the length of the bars is increased as in Example 3. When the length of the bars is increased, the bars are easily torsionally deformable. Thus, it is conceivable that the quantities of torsional deformation of the bars were so increased that the bars were loosely torsionally deformed although the angle of inclination of the mirror portion was enlarged and hence the resonance frequency in the mirror portion and the torsion bars was reduced. Comparing Examples 3 and 4 with each other, it has been recognized that the angle of inclination of the mirror portion is reduced and the resonance frequency is enlarged when the end portions of the driving portions and those of the bars are connected with each other as in Example 4. This is conceivably because the driving portions were rendered hard to deform by the weights of the torsion bars when the length of the torsion bars was increased while no portions protruded outward from the driving portions and hence the number of portions of the driving portions contributing to resonance of the mirror portion and the torsion bars was increased.

In the vibrating mirror element according to the present invention, both of the angle of inclination of the mirror portion and the resonance frequency are preferably enlarged, in consideration of enlargement of a scanning range and improvement of a scanning rate at the time of one-dimensionally scanning the reflected light of the laser beam or the like applied to the mirror portion. In other words, Example 1 corresponding to the vibrating mirror element 10 according to the embodiment of the present invention, capable of enlarging both of the angle of inclination of the mirror portion and the resonance frequency, is conceivably optimum.

The angle of inclination of the mirror portion is enlarged when the bars are easily deformable as in Example 3, and hence it has been recognized that the width of the bars is preferably not more than half that of the driving portions.

Although the present invention has been described and illustrated in detail, it is clearly understood that the same is by way of illustration and example only and is not to be taken by way of limitation, the spirit and scope of the present invention being limited only by the terms of the appended claims.

Figure 15:
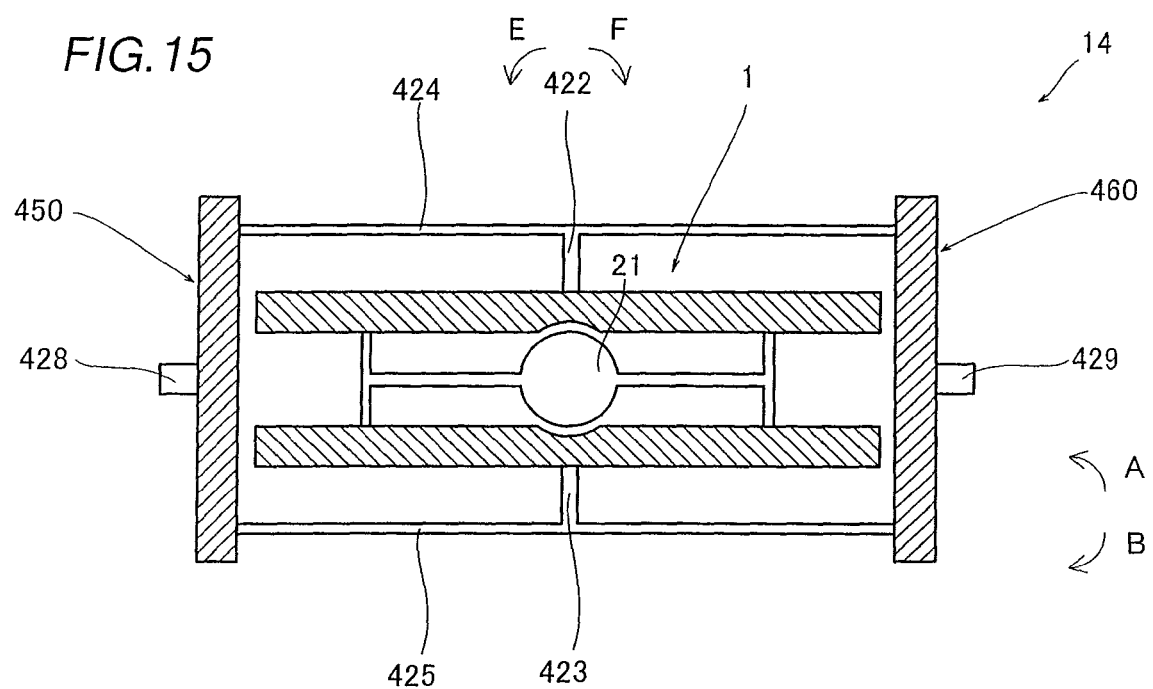
FIG. 15 is a plan view showing the overall structure of a vibrating mirror element according to a modification of the embodiment of the present invention.

For example, while the mirror portion 21 of the vibrating mirror element 10 is inclined only in the directions A and B (in a one-dimensional manner) in the aforementioned embodiment, the present invention is not restricted to this. According to the present invention, the mirror portion of the vibrating mirror element may alternatively be two-dimensionally inclined. As shown in FIG. 15, for example, a vibrating mirror element 14 may be formed by replacing the pair of fixed portions 28 and 29 of the vibrating mirror element 10 according to the aforementioned embodiment with a pair of torsion bars 422 and 423, so that end portions of the pair of torsion bars 422 and 423 are perpendicularly connected with central portions of a pair of bars 424 and 425 respectively. Both end portions of the pair of bars 424 and 425 are perpendicularly connected with a pair of driving portions 450 and 460 respectively, while a pair of fixed portions 428 and 429 are fixed to bases (not shown). Thus, the mirror portion 21 can, be two-dimensionally inclined and vibrated in directions A and B and directions E and F.

While the end portions 22a and 23a of the torsion bars 22 and 23 are connected to the bars 24 and 25 respectively in the aforementioned embodiment, the present invention is not restricted to this. According to the present invention, the torsion bars may alternatively be connected to intersect with the bars.

While the bar 24 is perpendicularly connected with the end portion 22b of the torsion bar 22 on the central portion 24a and the bar 25 is perpendicularly connected with the end portion 23b of the torsion bar 23 on the central portion 25a in the aforementioned embodiment, the present invention is not restricted to this. According to the present invention, the bars may alternatively be perpendicularly connected with the end portions of the torsion bars on positions other than the central portions. Further alternatively, the bars may not be perpendicularly connected with the end portions of the torsion bars.

While the piezoelectric bodies 50a and 60a are made of lead zirconate titanate (PZT) in the aforementioned embodiment, the present invention is not restricted to this. According to the present invention, the piezoelectric bodies may alternatively be made of a piezoelectric material, other than PZT, consisting of an oxide mainly composed of lead, titanium and/or zirconium or another piezoelectric material. For example, the piezoelectric bodies may be made of a piezoelectric material such as zinc oxide (ZnO), lead lanthanum zirconate titanate ((Pb,La)(Zr,Ti)O$_3$), potassium niobate (KNbO$_3$) or sodium niobate (NaNbO$_3$).

While the torsion bars 22 and 23 are formed to be torsionally deformable in the aforementioned embodiment, the present invention is not restricted to this. According to the present invention, the torsion bars may not be torsionally deformable.

While the end portions 50d, 50e, 60d and 60e of the driving portions 50 and 60 extend to protrude outward beyond the connecting portions 26a, 26b, 27a and 27b by the distance L5 respectively in the aforementioned embodiment, the present invention is not restricted to this. According to the present invention, not all end portions of the driving portions may protrude outward beyond the connecting portions, but any of the end portions of the driving portions may protrude beyond the connecting portions. Further, no end portions of the driving portions may protrude beyond the connecting portions. In addition, the distances between the end portions and the connecting portions may be different from each other.

While the mirror portion 21, the torsion bars 22 and 23, the bars 24 and 25, the movable portions 26 and 27 and the fixed portions 28 and 29 are integrally formed in the aforementioned embodiment, the present invention is not restricted to this. According to the present invention, the mirror portion, the torsion bars, the bars, the movable portions and the fixed portions may not be integrally formed, but a mirror portion, torsion bars, bars, movable portions and fixed portions consisting of separate members may alternatively be bonded to each other by adhesion or the like.

While the fixed portions 28 and 29 are provided in the vicinity of the central portion 50c of the driving portion 50 on the side of the direction X1 and in the vicinity of the central portion 60c of the driving portion 60 on the side of the direction X2 respectively and the recess portions 50f and 60f are provided on the side of the central portion of the driving portion 50 in the direction X2 and on the side of the central portion of the driving portion 60 in the direction X1 respectively in the aforementioned embodiment, the present invention is not restricted to this. According to the present invention, the fixed portions and the recess portions may not be proximately provided respectively.

While the width W1 of the torsion bars 22 and 23 and the width W2 of the bars 24 and 25 are rendered not more than half the width W3 of the driving portions 50 and 60 (movable portions 26 and 27) in the aforementioned embodiment, the present invention is not restricted to this. According to the present invention, the width W1 of the torsion bars and the width W2 of the bars may simply be smaller than the width W3 of the driving portions.

While the piezoelectric elements 30 and 40 are formed substantially on the overall upper surfaces of the movable portions 26 and 27 in the aforementioned embodiment, the present invention is not restricted to this. According to the present invention, the piezoelectric elements may not be formed substantially on the overall upper surfaces of the movable portions, but may be only partially formed on the upper surfaces of the movable portions as in Example 2 shown in FIG. 12, for example.

While the torsion bars 22 and 23 are formed to extend on the straight line passing through the center of the mirror portion 21 and extending in the direction Y in the aforementioned embodiment, the present invention is not restricted to this. According to the present invention, the torsion bars may not be formed to extend on the straight line passing through the center of the mirror portion and extending in the direction Y.

While the recess portions 50f and 60f are formed on the driving portions 50 and 60 respectively in the aforementioned embodiment, the present invention is not restricted to this. According to the present invention, no recess portions may be formed on the driving portions.

While the mirror portion 21 has a circular shape in plan view in the aforementioned embodiment, the present invention is not restricted to this. According to the present invention, the mirror portion may alternatively have a square shape or a rectangular shape in plan view.

What is claimed is:

1. A vibrating mirror element comprising:
   a mirror portion reflecting light;
   a pair of first beam portions having first end portions connected with both sides of said mirror portion respectively for supporting said mirror portion in a vibratile manner;
   a pair of second beam portions connected to second end portions of said pair of first beam portions respectively; and
   a pair of driving portions connected with first end portions and second end portions of said pair of second beam portions respectively for vibrating said mirror portion, wherein
   said mirror portion is arranged in a region surrounded by said pair of second beam portions and said pair of driving portions in plan view, while the width of said pair of first beam portions and the width of said pair of second beam portions are rendered smaller than the width of said pair of driving portions,
   both end portions of said pair of driving portions serve as free ends respectively, and
   said pair of second beam portions are rendered inclinable by deformation of said pair of driving portions respectively, while said pair of first beam portions are formed to incline said mirror portion by inclination of said pair of second beam portions.

2. The vibrating mirror element according to claim 1, wherein
   said first beam portions are formed to be torsionally deformable by inclination of said pair of second beam portions respectively, and
   said mirror portion is inclined by inclination of said pair of second beam portions and torsional deformation of said pair of first beam portions.

3. The vibrating mirror element according to claim 1, wherein
   at least one of end portions of said pair of driving portions extends to protrude outward beyond connecting portions between end portions of said second beam portions and said driving portions.

4. The vibrating mirror element according to claim 3, wherein
   both end portions of at least one of said pair of driving portions extend to protrude outward beyond said connecting portions between said end portions of said second beam portions and said pair of driving portions by substantially identical lengths respectively.

5. The vibrating mirror element according to claim 3, wherein
   end portions, included in both end portions of said pair of driving portions, connected with one of said pair of second beam portions extend to protrude outward beyond said connecting portions between said end portions of said second beam portions and said pair of driving portions by substantially identical lengths respectively.

6. The vibrating mirror element according to claim 1, wherein
   said pair of second beam portions are substantially perpendicularly connected with said second end portions of said pair of first beam portions on substantially central portions of said pair of second beam portions respectively in plan view, while said pair of driving portions are substantially perpendicularly connected with said first end portions and said second end portions of said pair of second beam portions respectively in plan view.

7. The vibrating mirror element according to claim 1, further comprising a pair of fixed portions provided in the vicinity of central portions of said pair of driving portions in the longitudinal direction respectively for constituting fixed ends in vibration of said pair of driving portions and fixing said pair of driving portions.

8. The vibrating mirror element according to claim 7, wherein
said pair of fixed portions are integrally formed on said pair of driving portions respectively.

9. The vibrating mirror element according to claim 1, wherein
a pair of recess portions are formed on portions of said pair of driving portions corresponding to the periphery of said mirror portion to be along the periphery of said mirror portion respectively in plan view.

10. The vibrating mirror element according to claim 9, further comprising a pair of fixed portions provided on sides opposite to connecting portions between end portions of said second beam portions and said pair of driving portions and in the vicinity of central portions of said pair of driving portions in the longitudinal direction respectively for constituting fixed ends in vibration of said pair of driving portions and fixing said pair of driving portions, wherein
said pair of recess portions are provided in the vicinity of said central portions of said pair of driving portions in the longitudinal direction on the sides of said connecting portions respectively.

11. The vibrating mirror element according to claim 9, wherein
the widths of portions of said driving portions other than said recess portions are rendered substantially identical to each other along the longitudinal direction of said driving portions.

12. The vibrating mirror element according to claim 1, wherein
the width of said pair of first beam portions and the width of said pair of second beam portions are rendered not more than half the width of said pair of driving portions.

13. The vibrating mirror element according to claim 1, wherein
said mirror portion, said pair of first beam portions and said pair of second beam portions are integrally formed.

14. The vibrating mirror element according to claim 13, wherein
said pair of driving portions include a pair of movable portions integrally formed with said mirror portion, said pair of first beam portions and said pair of second beam portions and a pair of driving elements formed on the surfaces of said pair of movable portions respectively.

15. The vibrating mirror element according to claim 1, wherein
said pair of driving portions include a pair of movable portions connected with said pair of second beam portions and a pair of driving elements formed substantially over the entire surfaces of said pair of movable portions.

16. The vibrating mirror element according to claim 1, wherein
said pair of driving portions are formed to be driven by application of voltages respectively,
said mirror portion and said pair of first beam portions are formed to resonate at a prescribed resonance frequency, and
said pair of driving portions are formed to be deformed in opposite directions by application of voltages having frequencies substantially identical to said prescribed resonance frequency and having phases reverse to each other respectively.

17. The vibrating mirror element according to claim 1, wherein
said pair of first beam portions are formed to extend on a straight line passing through the center of said mirror portion toward one one side of said mirror portion and toward another side of said mirror portion respectively, and
said pair of driving portions are formed to extend in a direction substantially parallel to the extensional direction of said pair of first beam portions respectively.

18. The vibrating mirror element according to claim 1, further comprising:
a pair of first outer beam portions having first end portions connected with said pair of driving portions respectively,
a pair of second outer beam portions connected with second end portions of said pair of first outer beam portions respectively, and
a pair of outer driving portions connected with first end portions and second end portions of said pair of second outer beam portions respectively for vibrating said mirror portion.

* * * * *